United States Patent [19]

Kimura

[11] 4,392,726
[45] Jul. 12, 1983

[54] AUTOMATIC FOCUS CONTROL SYSTEM FOR VIDEO CAMERA WITH IMPROVED POSITION DETECTING APPARATUS

[75] Inventor: Kenji Kimura, Tachikawa, Japan

[73] Assignee: Olympus Optical Co., Ltd., Tokyo, Japan

[21] Appl. No.: 262,918

[22] Filed: May 12, 1981

[30] Foreign Application Priority Data

Jun. 13, 1980 [JP] Japan ................... 55-79742

[51] Int. Cl.³ .................................... G03B 7/08
[52] U.S. Cl. ............................. 354/25; 358/227
[58] Field of Search .............. 354/25 R; 358/227

[56] References Cited

U.S. PATENT DOCUMENTS

| | | | |
|---|---|---|---|
| Re. 30,099 | 9/1979 | Hosoe et al. | 354/25 R |
| 3,898,676 | 8/1975 | Hosoe et al. | 354/25 R |
| 4,005,443 | 1/1977 | Albrecht | 354/25 R |
| 4,053,934 | 10/1977 | Kornreich et al. | 354/25 R |
| 4,133,606 | 1/1979 | Hosoe et al. | 354/25 R |
| 4,184,753 | 1/1980 | Hashimoto et al. | 354/25 |
| 4,277,156 | 7/1981 | Fukushima et al. | 354/25 R |

FOREIGN PATENT DOCUMENTS

| | | | |
|---|---|---|---|
| 2408746 | 9/1974 | Fed. Rep. of Germany | 354/25 R |
| 54-88121 | 7/1979 | Japan | |

Primary Examiner—Russell E. Adams
Attorney, Agent, or Firm—Frishauf, Holtz, Goodman & Woodward

[57] ABSTRACT

An automatic focus control system for a video camera includes a first circuit which provides a detection signal having higher frequency components of a video signal provided by the video camera. The level of the detection signal varies according to a relative distance between the lens system of the video camera and the light receiving plane of the image pickup device of the video camera. The focus control system also includes a second circuit which detects an extreme value of the amplitude of the detection signal, and fixes the relative distance between the lens system and the light receiving plane of the image pickup device by stopping the actuation of the focusing mechanism of the video camera.

17 Claims, 6 Drawing Figures

AUTOMATIC FOCUS CONTROL SYSTEM FOR VIDEO CAMERA WITH IMPROVED POSITION DETECTING APPARATUS

BACKGROUND OF THE INVENTION

This invention relates to a focus control apparatus for automatically controlling the focus adjustment of an optical system in a television camera, etc.

Where an image is picked up through a television camera, etc., the focal depth or depth of field must be properly controlled at all times to obtain a clear-cut image. When in particular the image of an object in a relatively dark, near distance is picked up, since the depth of focus is shallow, the focus control must be made each time the distance between the object and the camera greatly varies. Unless, in this case, focus control is properly made according to the variation of the distance between the object and the camera, the resolution of a reproduced image is lowered, resulting in the image being out-of-focus. It is very difficult and cumbersome to effect focus control of the camera according to each variation of the object distance. A camera having manual focus control requires much skill on the part of the operator and involves a complicated arrangement for the enhancement of the focussing operation.

SUMMARY OF THE INVENTION

It is accordingly the object of this invention to provide a focus control apparatus which can automatically effect focus control according to a distance between an object to be picked up and a camera.

This invention pays attention to the fact that higher frequency components are decreased in a video signal corresponding to a lower-resolution image not correctly in focus and that the higher frequency components are increased in the video signal as the resolution of an image in focus in enhanced. In the focus control apparatus according to this invention the higher frequency components of the video signal are extracted and focus control is automatically fixed to a position where the high frequency component takes a substantially extreme value. An automatic focus control operation can be initiated using, for example, an exclusive start switch for standby mode-automatic mode changeover. The start switch may be connected in interlock with a picture-recording start button of the camera. Although the extreme value of the high frequency components of the video signal is usually a maximal value, it is possible to utilize a minimal value. This is because, if a signal including the high frequency components is phase-inverted or polarity-reversed, the maximal value becomes a minimal value.

DETAILED DESCRIPTION OF THE PREFERRED EMBODIMENTS

Before proceeding with the description of the embodiments of the invention, it will expressly be understood that like reference symbols are used to designate like portions throughout the drawings for simplicity of illustration and that the components designated by like reference symbols may easily be replaced with each other or one another with minor change thereof by a skilled person in the art.

Figure 1:
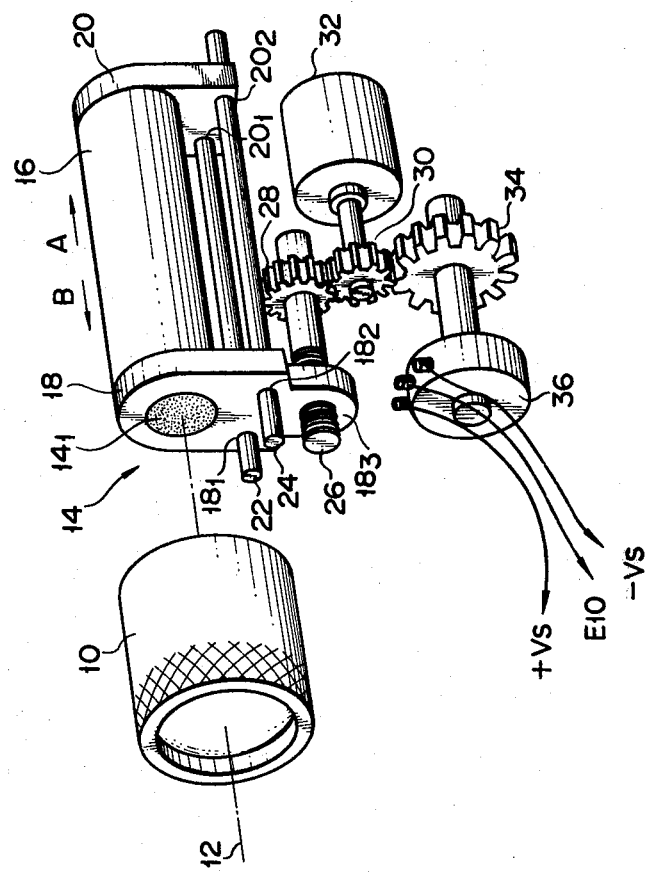
FIG. 1 is a perspective view showing the mechanism of a focus control apparatus according to one embodiment of this invention.

FIG. 1 shows a mechanism in a television camera body equipped with a focus control apparatus. A lens system 10 is fixed in place in the camera body. The light receiving surface, i.e. the target surface $14_1$, of an image sensor element 14, such as CCD, vidicon, is arranged on an optical axis 12 of the lens system 10. A yoke assembly 16 is disposed on the outer peripheral surface of the element 14 and the assembly 16 is supported at its forward end by a slide support 18 and at its rear end by a slide support 20. A guide bar 22 is inserted through bores $18_1$ and $20_1$ in the supports 18 and 20. Similarly, a guide bar 24 is inserted through bores $18_2$ and $20_2$ in the supports 18 and 20. The guide bars 22 and 24 are fixed to the camera body parallel to the optical axis 12. An internal thread is provided on a screw feed portion $18_3$ of the support 18 and a feed screw or a worm gear 26 is inserted through the internal thread of the support 18. A shaft on which the worm gear 26 is formed is coupled to a shaft of a motor 32 through gears 28 and 30. The shaft of the motor 32 is coupled to a shaft of a potentiometer 36 through gears 30 and 34.

As a motor 32 used herein, for example, a DC reversible motor is suitable. The image sensor element 14 is moved forward and backword, in the directions of arrows A, B and parallel to the optical axis 12, according to the rotation direction and rotation amount of the motor 32. This movement is such a relative movement that the center of the target surface $14_1$ is aligned with the optical axis 12 and that a relative angle of the lens surface of the lens system 10 to the target surface $14_1$ is maintained in a predetermined relation. The component elements 18 to 32 constitute a moving means for varying a relative distance of the lens system 10 to the light receiving surface $14_1$ such that an object is focused on the light receiving surface $14_1$ of the image sensor means 14. The rotation direction and rotation amount of the motor 32 correspond to the rotation direction and rotation amount of the potentiometer 36. From the potentiometer 36 it is possible to obtain information, i.e. a position signal E10, relating to the relative position of the target surface $14_1$ to the lens system 10. In this embodiment, the full stroke of the target surface $14_1$ corresponds to, for example, 10 rotations of the potentiometer 36.

Figure 2:
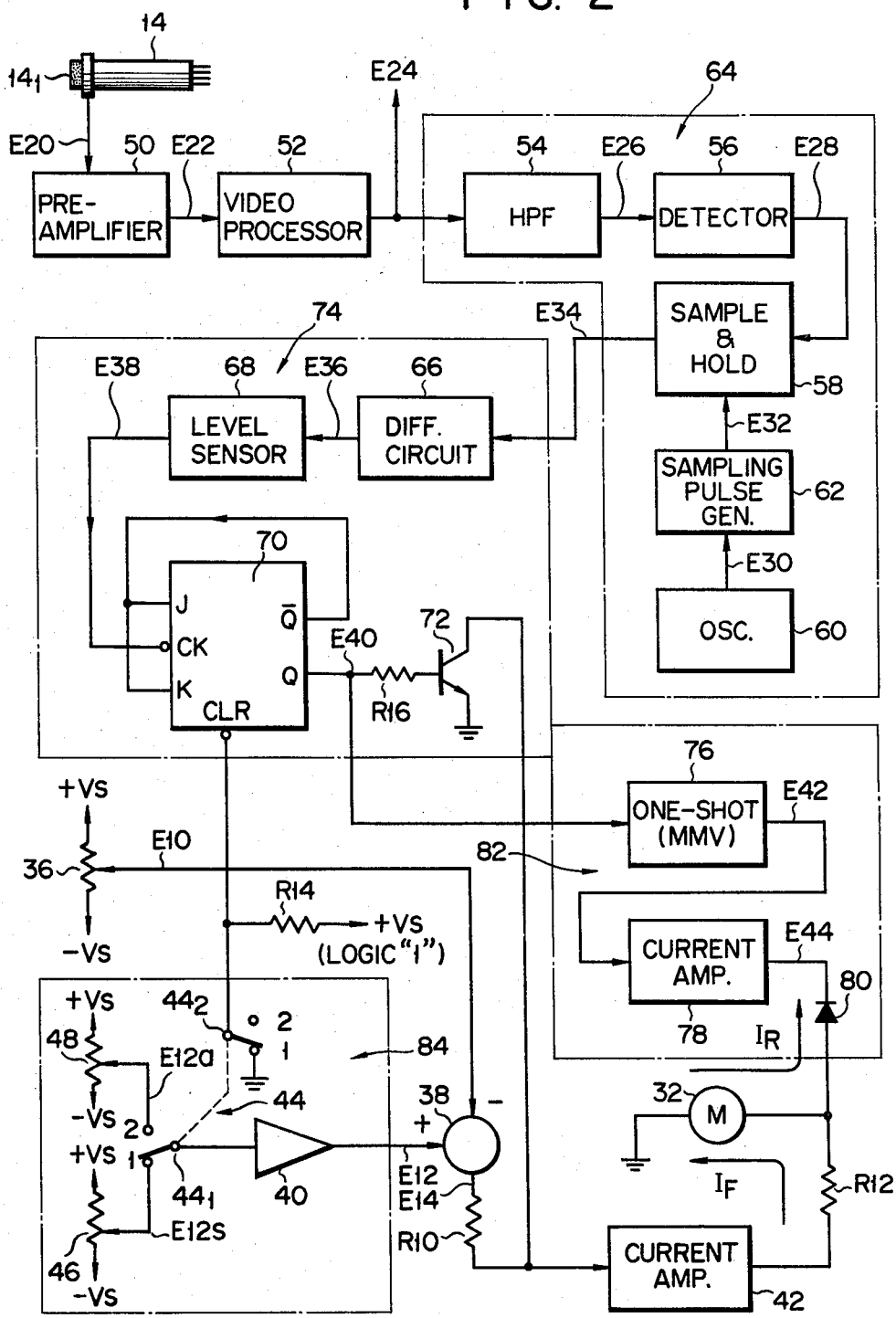
FIG. 2 is a block diagram showing an electrical circuit arrangement constituting the focus control apparatus together with the mechanism of FIG. 1.

FIG. 2 shows an electric circuit system constituting a focus control apparatus together with the mechanism as shown in FIG. 1. The position signal E10 is applied to a negative input of a subtracter 38. A position designation signal E12 is outputted from an amplifier 40 and supplied to a positive input of the subtracter 38. An error signal E14 corresponding to a difference of the signals E12 and E10 are outputted from the subtracter 38. The signal E14 is inputted to a current amplifier 42 through a resistor R10. The amplifier 42 has a current capacity great enough to drive the motor 32 and supplies a drive current IF corresponding to the signal E14 to the motor 32 through a resistor R12. As set out in connection with FIG. 1, the movement of the image sensor element 14 by the rotation of the motor 32 or the relative position of the target surface 14₁ to the lens system 10 is detected by the potentiometer 36. The motor 32 and potentiometer 36 are mechanically connected by the gears 30 and 34. The component elements 36, 38, 42 and 32 form a servo loop to which a control target is given by the signal E12.

The above-mentioned control target or the position designation signal E12 is determined by a position signal E12s or E12a which is inputted to the amplifier 40. The signal E12s is derived from the slider of a variable resistor 46 through a first contact of a switch 44₁. The signal E12a is derived from the slider of a variable resistor 48 through a second contact of the switch 44₁. A positive voltage $+V_s$ and negative voltage $-V_s$ are supplied to the corresponding terminals of the variable resistors 46 and 48 and the corresponding terminals of the potentiometer 36. The switch 44₁ is in interlock with the later-described switch 44₂ and constitutes a changeover switch 44 of a two-circuit two-gang type. The switch 44 is used to effect changeover between the standby mode (the first contact) and the automatic mode (the second contact). When the automatic focus control operation starts, the switch 44 is switched from the first contact side to the second contact side. Optical information is focused on the target surface 14₁ of the image sensor element 14 and converted to image information E20 and inputted to a preamplifier 50. A signal E22 amplified at the preamplifier 50 is processed at a video signal processor 52 and converted to a video signal (composite video signal) E24. The signal E24 is sent to, for example, a monitor TV and VTR. The arrangement of the processor 52 is generally known and a detail of the processor is therefore omitted.

Figure 3:
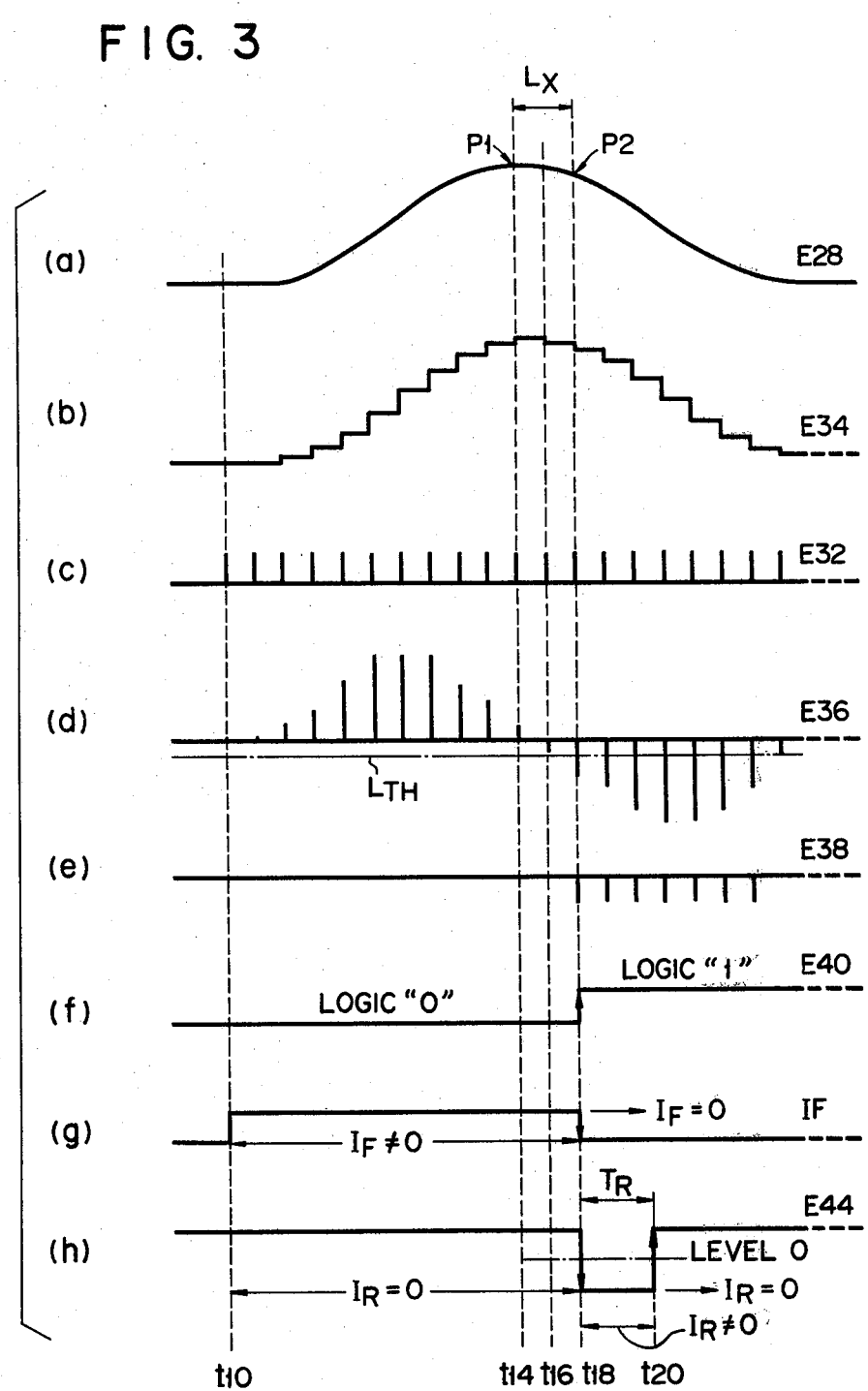
FIG. 3 is a timing chart for explaining a circuit arrangement as shown in FIG. 2.

The video signal E24 is inputted to a highpass filter (HPF) 54 and the frequency response characteristic of HPF 54 can be relatively freely determined. For example, it is possible to use an active filter of a cutoff frequency of 500 kHz to 1 MHz. HPF 54 delivers a first signal E26 corresponding to the higher frequency components of the signal E24. The signal E26 is inputted into a detector 56. The detector 56 produces a second signal E28, as shown in FIG. 3(a), having an envelope corresponding to the amplitude of the signal E26. The time constant of detection of the detector 56 is set to an optimal value according to the trackability of a servo loop including the motor 32. In this embodiment, the time constant of detection is about 0.1 second. The signal E28 is inputted into a sample/hold circuit 58. The sample/hold circuit 58 samples and holds the level of the signal E28 at a predetermined ratio. The predetermined ratio is determined according to the cycle of an oscillation output E30 of an oscillator 60. The cycle has a relation to the accuracy of the focus control operation, but it is tentatively 0.1 second (corresponding to 10 Hz) in this embodiment. If the cycle is too short, an unstable operation is involved due to the irregular rotation of the motor 32, etc. This is the reason why the cycle cannot be made excessively short. The output E30 is inputted into a sampling pulse generator 62 where it is converted to a sampling pulse E32, as shown in FIG. 3(c), which is in synchronism with the output E30. The second signal E28 is supplied to the sample/hold circuit 58 where it is sampled and held in the generation timing of the pulse E32. By so doing, a detection signal E34 as shown in FIG. 3(b) is outputted from the sample/hold circuit 58. The resolution of the object whose image is focused on the target surface 14₁ varies according to the variation of the relative distance of the target surface 14₁ to the lens system 10. If the image is not correctly in focus, the image on the target surface 14₁ is blurred. For this reason, the higher frequency components of a frequency spectrum of the image information E20 are relatively low in their level, as compared with the level of their lower frequency components. When the image of the object is correctly in focus, the image focused on the target surface 14₁ is made clear in its detailed contrast. The level of the higher frequency components of the image information E20 becomes greater with an increase in the accuracy of focusing. The greatness of the level is more prominently manifested, as the frequency components become nearer to the higher frequency side in a frequency range including the image signal. In consequence, the high frequency components of the video signal E24 also vary according to the extent of image focusing. The component elements 54 to 62 as shown in FIG. 2 constitutes a first means 64 for producing the detection signal E34 whose level varies according to a variation of the relative distance of the target surface 14₁ (or the light receiving surface) to the lens system 10. The variation of the relative distance is indicated on the abscissa (the time base) as shown in FIG. 3.

The detection signal E34 is inputted into a differentiation circuit 66. From the circuit 66 a third signal E36 is outputted according to the points of change in level of the signal E34 as shown in FIG. 3(d), the magnitude and direction of the change of the signal E36 corresponding to those of the signal E34. The circuit 66 constitutes a differentiation circuit which provides the third signal E36 representative of a rate of change in level of the detection signal E34. The signal E36 is inputted into a level sensor 68. The sensor 68 has a predetermined threshold level $L_{TH}$ as shown in FIG. 3(d) and, when the level of the signal E36 is less than a level $L_{TH}$, a fourth signal E38 as shown in FIG. 3(e) is outputted. That is, the level sensor 68 constitutes an identification means for providing the fourth signal E38 when the third signal E36 corresponds to the predetermined threshold level $L_{TH}$.

The fourth signal E38 is applied to the clock input terminal CK of J-K flip-flop 70. The inverted output terminal Q of the flip-flop 70 is connected to the J and K input terminals. The clear terminal CLR of the flip-flop 70 is connected to the positive voltage $+V_s$, corresponding to a logic level "1", through a resistor R14. When the clear terminal CLR of the flip-flop 70 is grounded through a first contact of the switch 44₂, the flip-flop 70 is not clocked and the output terminal Q of the flip-flop 70 is at the logic level "0". When the switch 44₂ is switched to the second contact side and the clear state is released, the flip-flop 70 can be clocked by the signal E38. Then, a fifth signal E40 of a logic level "1" as shown at time t18 et. seq. in FIG. 3(f) is outputted from the output terminal Q of the flip-flop 70. The signal E40 is applied to the base of an NPN transistor 72 through a resistor R16. The emitter of the transistor 72 is grounded and the collector of the transistor 72 is connected to the input circuit of the current amplifier 42. When the flip-flop 70 is clocked and the signal E40 is at a logic "1", the transistor 72 is turned ON. The input circuit of the amplifier 42 is grounded through a collector-to-emitter path of the transistor 72. In this case, the input level of the amplifier 42 becomes zero and, as indicated in time t18 et. seq. in FIG. 3, the drive current IF of the motor 32 becomes zero. As a result, the rotation of the motor 32 is stopped. That is, the flip-flop 70 and transistor 72 constitute a stopping means for stopping the change of the relative movement of the image sensor element to the lens system by the movement means (18 to 32) based on the fourth signal E38.

As shown in FIGS. 3(a) to 3(g), the point at which the transistor 72 is turned ON by the logic "1" of the fifth signal E40 and the drive current IF to the motor 32 becomes zero corresponds to a point at which the detection signal E34 becomes substantially maximal. This point is indicated by P2 on the second signal E28 in FIG. 3(a). A true maximal point on the signal E28 or E34 is indicated by P1 at time t14. When the cycle of the sampling pulse E32 is sufficiently short, it can be considered that P1≈P2. That is, the resolution of the image at the point P2 is substantially equal to that of the image at the point P1. The point P2 can be regarded as a point at which the detection signal E34 takes a substantially extreme value. The point P2 is a point at which the image is correctly in focus and thus a better resolution is obtained (A best point is indicated by P1 and an arrangement for finding that point will be set out later.) That is, the component elements 66 to 72 constitute a second means 74 for fixing the relative distance of the target surface $14_1$ to the lens system 10 when the detection signal E34 takes a substantially extreme value. Such fixing is effected by making the drive current IF of the motor 32 zero in FIG. 2.

The fifth signal E40 is inputted into a one-shot monostable multivibrator (MMV) 76. MMV 76 is triggered by a logic level variation ("0"→"1") of the signal E40. The output signal E42 of MMV 76 is inputted into the current amplifier 78. The current amplifier 78 amplifies the signal E42 and delivers a reverse-drive current IR corresponding to the level of the signal E42. Before MMV 76 is triggered, the output potential E44 of the amplifier 78 becomes higher. A diode 80 is connected between the current amplifier 78 and the motor 32 and reverse-biased such that $I_R=0$. If, on the other hand, the signal E40 becomes a logic "1", MMV 76 is triggered and the output potential E44 of the amplifier 78 is lowered by a predetermined time period TR which is determined according to the time constant of MMV 76. By so doing, the diode 80 is forward-biased and, as shown in FIG. 3(h), during the time period TR the reverse-drive current IR flows through the motor 32. The term TR and magnitude of the current IR may be experimentally determined so as to bring the relative distance of the image sensor element to the lens system at IF (current)=0 back to the relative distance corresponding to the point P1. The component elements 76 to 80 constitute a third means 82 which, when the change of the relative distance mentioned is in the first direction (for example, in the direction of A in FIG. 1) and the detection signal E34 exceeds the extreme value by a predetermined amount, causes a variation (corresponding to Lx in FIG. 3(a)) of the relative distance corresponding to the predetermined amount to be imparted to the second direction (the direction B in FIG. 1).

The focus control apparatus as shown in FIGS. 1 and 2 is operated as follows:

When the changeover switch 44 is in the first contact side, the position designation signal E12 which is the control target of the servo loop varies according to the variable resistor 46 and the flip-flop 70 is cleared. In this case, the transistor 72 is rendered OFF and MMV 76 is in a ready state for triggering. By adjusting the variable resistor 46 the target surface $14_1$ is moved to a position nearest to the lens system 10 and in this way the relative distance is made minimal. At this time, the signal E12s corresponds to the standby state and the focal distance of the lens system 10 is made maximal (in a state in which the object at infinity is brought to a focus). The signal E12a extracted from the variable resistor 48 is used to the automatic control and the variable resistor 48 is controlled such that the focal distance of the lens system 10 is minimal (in a state that the nearest object is brought to a focus). That is, the component elements 40, 44, 46 and 48 constitute a fourth means 84, whereby before focus control is commenced the relative distance of the image sensor element to the lens system is set at a position corresponding to the terminal position of the second direction as indicated by the arrow B in FIG. 1 and, when the focus control is started by switching the switch 44 from the first contact side to the second contact side, the direction of a variation or change of the relative distance mentioned is switched over to the first direction as indicated by the arrow A in FIG. 1. Before time t10 in FIG. 3 it is shown that the changeover switch 44 is in the standby state i.e. on the first contact side. Here, consider the case where a distance between the object and the camera corresponds to a position intermediate between the maximal and minimal distances between which focal control is permitted. Consider also that at time t10 the switch 44 is switched over to the second contact side in interlock with the "shot" start button of a camera not shown. In this case, the target surface $14_1$ is moved in the direction as indicated by the arrow A and the image of the object which is focused on the target surface $14_1$ becomes gradually clearer. As mentioned earlier, therefore, the higher frequency components of the video signal E24 become greater in their level and, as shown in FIG. 3(a), the signal E28 becomes gradually greater. As shown in FIG. 3(b) the level of the detection signal E34 is increased in a step-like fashion. Such a step-like variation is in synchronism with the sampling pulse E32 as shown in FIG. 3(c).

The level of the signal E34 undergoes a step-like variation, corresponding to the amplitude variation of the signal E28, in a timing in which the pulse E32 is generated. The step-like variation, if differentiated, offers the signal E36. At time t14, the signal E34 takes a maximal value and, at the following time, is decreased in its level. At time t16, the signal E36 goes from a positive to a negative level. Since at this time the level of the signal E36 does not exceed the threshold level $L_{TH}$, the signal E38 does not vary. When at time t18, a negative-level signal E36 exceeding the threshold level $L_{TH}$ is produced, the fourth signal E38 as shown in FIG. 3(e) is produced. Then, the flip-flop 70 is clocked, causing the signal E40 to become a logic "1" level as shown in FIG. 3(f). At this time, the J and K terminals of the flip-flop 70 become the logic "0" levels, holding the clocked state.

At the rise of the signal E40 at time t18 the transistor 72 is turned ON and MMV 76 is triggered. When the transistor 72 is turned ON, the drive current IF for moving the target surface $14_1$ in the direction of the arrow A in FIG. 1 becomes zero. While MMV 76 is being triggered i.e. during the time period TR from t18 to t20 in FIG. 3(h), the reverse-drive current IR is supplied to the motor 32 in place of the current IF. By so doing, the target surface $14_1$ is returned, during the time period TR, in the direction of the arrow B by an amount corresponding to the current IR and the period TR, and stopped. The time constant of MMV 76 and magnitude of the current IR are experimentally decided so that the stopped position at this time is corresponding to the point P1 in FIG. 3. In this embodiment, the time constant of MMV 76 is determined to be about 0.2 second. Although the parameters TR and IR are properly varied dependent upon the inertia of the mechanical system as shown in FIG. 1, the cycle of the pulse E32 and so on, it is not necessary to sequentially change the parameters TR and IR, once determined, in the same television camera.

Figure 4A:
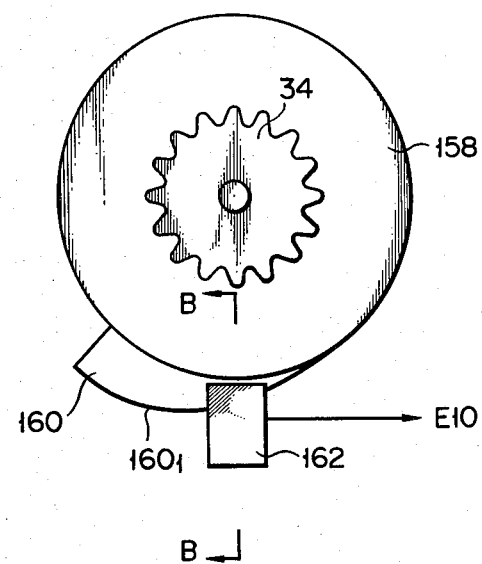
FIGS. 4A, 4B and 5 show the case where a potentiometer 36 is replaced by a photoelectric converter.
Figure 4B:
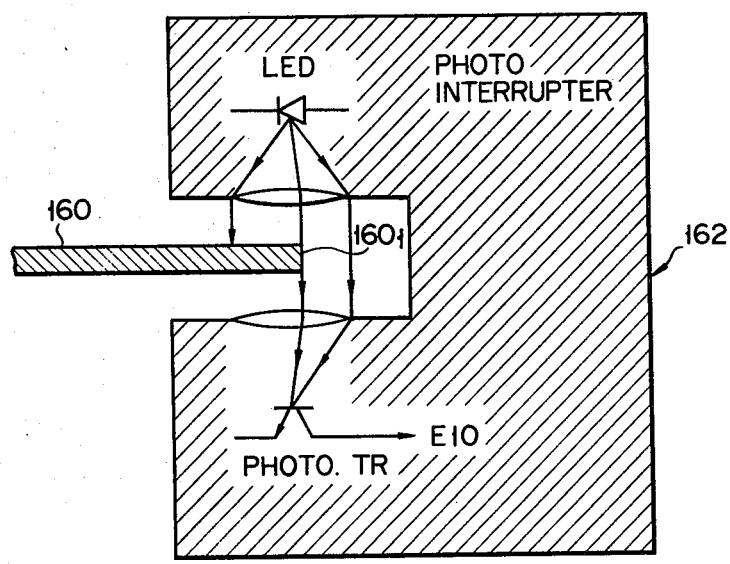

FIGS. 4A and 4B show the case where the potentiometer 36 is replaced by a photoelectric converter. In FIG. 4A, a disk 158 with a screen 160 is disposed on the same axis as that of the gear 34 and rotated together with the gear 34. The screen 160 crosses an optical path of the photointerrupter 162. The screen 160 includes a wing portion $160_1$ which varies in a manner to describe, for example, an involute curve. When the screen 160 is rotated by the rotation of the gear 34, an amount of light shut off by the interrupter 162 with respect to the screen 160 varies.

FIG. 4B is a cross-sectional view as taken along line B—B in FIG. 4A. The photointerrupter 162 includes an LED as a light source and a phototransistor as a light sensor. A flow of a flux of light from LED to the phototransistor is partially shut off by the screen 160. The extent of the shutting off of the light varies according to the rotation position of the gear 34 i.e. the relative position of the screen 160 to the photointerrupter 162. In consequence, the collector current E10 (position signal) of the phototransistor varies according to a distance between the lens system 10 and the assembly 16.

Figure 5:
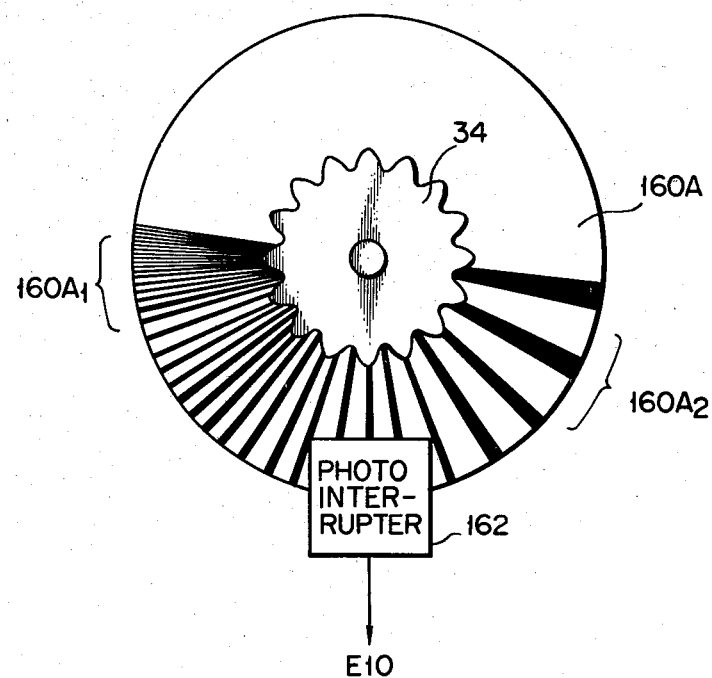

FIG. 5 shows another example in which the potentiometer 36 is replaced by the photointerrupter. In this example, a light-transmissive screen 160A for varying an average value of an amount of light transmitted is used in place of the involute screen 160. The light is passed at the white portions of the screen 160A, but not at the black portions of the screen 160A. Light is difficult to transmit at the crowded portion $160A_1$ of the screen 160A (an average amount of light transmitted is small) and easy to transmit at the noncrowded portion $160A_2$ of the screen 160A (an average amount of light transmitted is great). The position signal E10 is outputted from the interrupter 162 according to the rotation position of the gear 34.

This invention is not restricted in any way to the embodiment as disclosed in the specification and drawings. This invention can be varied in a variety of ways without departing from the spirit and scope of this invention. For example, HPF 54 may be replaced by a band pass filter having a band width of about 1 MHz to 4 MHz. If the inertia of the mechanical system of FIG. 1 and the nonuniformity of the transmission characteristic are small and the cycle of the sampling pulse E32 is sufficiently short, the third means 82 may be practically omitted when a stable operation is obtained. In this case, the point P2 in FIG. 3(a) practically corresponds to the point P1. Although in the embodiment the component elements 54 to 62 have been explained as the first means 64, the component elements 54 and 56 may be regarded as the first means. While in this embodiment the fixing of the relative distance of the target surface $14_1$ to the lens system 10 utilizes the ON operation of the transistor 72, any arrangement may be adopted so long as it permits the motor to be stopped. An analog gate such as an FET may be connected between the subtracter 38 and the amplifier 42. It is to be noted that the focus control apparatus of this invention can be used in connection with a focus control apparatus of Japanese Patent Application No. 55-58399 and/or an iris servo apparatus of Japanese Patent Application No. 55-56867, whose assignee is the same with that of this application.

What is claimed is:

1. A focus control apparatus adapted to a camera including a lens system, image pickup means for providing a video signal disposed on the optical axis of the lens system, and moving means for varying a relative distance between a light receiving surface of the image pickup means and the lens system so that an object is focussed onto the light receiving surface, said relative distance being varied in a first direction or a second direction which is opposite to said first direction, comprising:

first means coupled to said image pickup means including means for providing a detection signal which includes higher frequency components of the video signal provided by said image pickup means; and means for varying the level of said detection signal according to said relative distance between said light receiving surface and said lens system;

second means coupled to said first means and to said moving means for fixing said relative distance when said detection signal substantially takes an extreme value; and third means coupled to said second means and to said moving means for causing a predetermined amount of the relative distance variation in said second direction when the relative distance variation is effected in said first direction and when the relative distance variation in said first direction exceeds by said predetermined amount a point at which said detection signal takes said extreme value;

said third means including activating means coupled to said moving means for actuating said moving means during a given predetermined period of time which corresponds to said predetermined amount of said relative distance variation in said second direction.

2. A focus control apparatus of claim 1, further comprising fourth means coupled to said moving means for setting said relative distance at a terminating position of said second direction before the focus control is commenced and for switching the direction of said relative distance variation from said second direction to said first direction after the focus control is commenced.

3. A focus control apparatus of claim 1 or 2, wherein said first means includes:

filter means for providing a first signal corresponding to the higher frequency components of said video signal;

detector means coupled to said filter means for providing a second signal having a level corresponding to the amplitude of said first signal; and sample/hold means coupled to said detector means for sampling and holding the level of said second signal with a given rate to provide said detection signal.

4. A focus control apparatus of claim 1 or 2, wherein said second means includes:

differentiator means coupled to said first means for providing a third signal having a positive or negative polarity and indicating a level change rate of said detection signal;

discriminator means coupled to said differentiator means for discriminating said third signal from a predetermined threshold level to provide a fourth signal when the polarity of said third signal has been changed and said third signal corresponds to said predetermined threshold level; and stopper means coupled to said discriminator means and to said moving means for stopping said relative distance variation by said moving means according to said fourth signal.

5. A focus control apparatus of claim 3, wherein said second means includes:

differentiator means coupled to said first means for providing a third signal having a positive or negative polarity and indicating a level change rate of said detection signal;

discriminator means coupled to said differentiator means for discriminating said third signal from a predetermined threshold level to provide a fourth signal when the polarity of said third signal has been changed and said third signal corresponds to said predetermined threshold level; and stopper means coupled to said discriminator means and to said moving means for stopping said relative distance variation by said moving means according to said fourth signal.

6. A focus control apparatus of claim 4, wherein the extreme value of said detection signal is detected based on the change of the polarity of said third signal.

7. A focus control apparatus of claim 5, wherein the extreme value of said detection signal is detected based on the change of polarity of said third signal.

8. A focus control apparatus of claim 4, wherein the timing at which the direction of said relative distance variation is switched from said first direction to said second direction is determined by said discriminator means.

9. A focus control apparatus of claim 5, wherein the timing at which the direction of said relative distance variation is switched from said first direction to said second direction is determined by said discriminator means.

10. A focus control apparatus of claim 6, wherein the timing at which the direction of said relative distance variation is switched from said first direction to said second direction is determined by said discriminator means.

11. A focus control apparatus of claim 7, wherein the timing at which the direction of said relative distance variation is switched from said first direction to said second direction is determined by said discriminator means.

12. A focus control apparatus adapted to a camera including a lens system, photographing means for providing a photo signal and focusing means for varying a relative distance between a light receiving plane of the photographing means and the lens system so that an object is focused onto the light receiving plane, said relative distance being varied in a forward direction or a reverse direction which is opposite to said forward direction, comprising:

first means coupled to said photographing means and including means for sampling and holding the level of said photo signal to provide a detection signal having a staircase-like waveform which contains higher frequency components of the photo signal obtained from said photographing means; and means for varying the level of said detection signal according to said relative distance between said light receiving surface and said lens system;

second means coupled to said first means and to said focusing means for detecting a level change portion of said staircase-like detection signal and for fixing said relative distance when the level change portion of said detection signal substantially corresponds to an extreme value of the level of said photo signal; and third means coupled to said second means and to said focusing means for causing a given amount of the relative distance variation in a forward direction when the relative distance variation is effected in a reverse direction opposite to the forward direction and when the relative distance variation in the reverse direction exceeds by said given amount a point at which said detection signal takes said extreme value;

said third means including actuating means coupled to said moving means for actuating said moving means during a given predetermined period of time which corresponds to said given amount of relative distance variation in said forward direction.

13. A focus control apparatus of claim 12, further comprising:

fourth means coupled to said focusing means for setting said relative distance at a terminating position of said forward direction before the focus control is commenced and for switching the direction of said relative distance variation from said forward direction to said reverse direction after the focus control is commenced.

14. A focus control apparatus of claim 12 or 13, wherein said first means includes:

filter means for providing a first signal corresponding to the higher frequency components of said photo signal;

detector means coupled to said filter means for providing a second signal having a level corresponding to the amplitude of said first signal; and sample/hold means coupled to said detector means for sampling and holding the level of said second signal with a given rate to provide said detection signal.

15. A focus control apparatus of claim 12 or 13, wherein said second means includes:

differentiator means coupled to said first means for providing a third signal having a positive or negative polarity and indicating a level change rate of said detecting signal;

discriminator means coupled to said differentiator means for discriminating said third signal from a fixed threshold level to provide a fourth signal when the polarity of said third signal has been changed and said third signal corresponds to said fixed threshold level; and stopper means coupled to said discriminator means and to said moving means for stopping said relative distance variation according to said fourth signal.

16. A focus control apparatus of claim 1, wherein said second direction is a forward direction along said optical axis, and said first direction is a reverse direction along said optical axis.

17. A focus control apparatus of claim 1 or 12, wherein said actuating means comprises a monostable multivibrator having a predetermined time constant.

* * * * *